US011491823B2

(12) United States Patent
Speziari et al.

(10) Patent No.: US 11,491,823 B2
(45) Date of Patent: Nov. 8, 2022

(54) TYRE FOR VEHICLE WHEELS (71) Applicant: Pirelli Tyre S.p.A., Milan (IT)

(72) Inventors: Diego Ettore Speziari, Milan (IT); Stefano Montesello, Milan (IT); Vito Bello, Monzo (IT)

(73) Assignee: PIRELLI TYRE S.p.A., Milan (IT)

( * ) Notice: Subject to any disclaimer, the term of this patent is extended or adjusted under 35 U.S.C. 154(b) by 349 days.

(21) Appl. No.: 16/767,898

(22) PCT Filed: Nov. 22, 2018

(86) PCT No.: PCT/IB2018/059207
§ 371 (c)(1),
(2) Date: May 28, 2020

(87) PCT Pub. No.: WO2019/111089
PCT Pub. Date: Jun. 13, 2019

(65) Prior Publication Data
US 2020/0369089 A1    Nov. 26, 2020

(30) Foreign Application Priority Data
Dec. 4, 2017    (IT) .................. 102017000139816

(51) Int. Cl.
*B60C 11/03*    (2006.01)
*B60C 11/12*    (2006.01)
(52) U.S. Cl.
CPC ...... *B60C 11/0304* (2013.01); *B60C 11/0302* (2013.01); *B60C 11/1204* (2013.01); *B60C 11/1236* (2013.01); *B60C 2011/0372* (2013.01)
(58) Field of Classification Search
None
See application file for complete search history.

(56) References Cited

U.S. PATENT DOCUMENTS 8,733,411 B2    5/2014 Mukai
2010/0252159 A1    10/2010 Mukai
(Continued)

FOREIGN PATENT DOCUMENTS

CN    101001762 A    7/2007
CN    102756618 A    10/2012
(Continued)

OTHER PUBLICATIONS

International Search Report form the European Paten tOffice in corresponding International Application No. PCT/IB2018/059207 dated Feb. 20, 2019.
(Continued)

*Primary Examiner* — Yung-Sheng M Tsui
(74) *Attorney, Agent, or Firm* — Finnegan, Henderson, Farabow, Garrett & Dunner, L.L.P.

(57) ABSTRACT

A tire for vehicle wheels comprises a tread band (2), on which a first circumferential rib (14) is formed, on which a plurality of first notches (20) are formed, which extend as a whole over at least 80% of the width of the first circumferential rib and each of which comprises: • i. a first portion (21) which is substantially rectilinear and has a first inclination with respect to a circumferential direction, • ii. a second portion (22) which is substantially rectilinear and has a second inclination with respect to the circumferential direction having a sign opposite to said first inclination, and • iii. a connecting portion (23) that extends between said first portion and said second portion; respective pluralities of the second and the third notches (30; 40), which are blind and substantially parallel to the first (21) and the second portion (22), respectively, of said first notches (20), are further formed on the first circumferential rib (14).

24 Claims, 2 Drawing Sheets

(56) References Cited

U.S. PATENT DOCUMENTS

2012/0267022 A1    10/2012  Tagashira
2012/0273108 A1    11/2012  Yoshida
2018/0126793 A1*    5/2018  Ito ........................ B60C 11/125

FOREIGN PATENT DOCUMENTS

| CN | 204109688 U | 1/2015 | |
|----|---|---|---|
| EP | 2514608 A2 | 10/2012 | |
| EP | 2517903 A1 * | 10/2012 | ......... B60C 11/0302 |
| EP | 2517903 A1 | 10/2012 | |
| GB | 1 289 657 A | 9/1972 | |
| JP | H 4-85107 A | 3/1992 | |
| JP | H06286424 A | 10/1994 | |
| JP | 2014-162250 A | 9/2014 | |
| JP | WO 2017082409 A1 | 5/2017 | |
| WO | WO 2006/007877 A | 1/2006 | |
| WO | WO 2009/060476 A | 5/2009 | |
| WO | WO-2017082409 A1 * | 5/2017 | ......... B60C 11/0304 |

OTHER PUBLICATIONS

Written Opinion ofthe International Searching Authority from the European Paten tOffice in corresponding International Application No. PCT/IB2018/059207 dated Feb. 20, 2019.

International Preliminary Report on Patentability from the International Bureau of WIPO for International Application No. PCT/IB2018/059207 dated Jun. 9, 2020.

Notification of the First Office Action dated Feb. 8, 2022, from China National Intellectual Property Administration in counterpart Chinese Application No. 201880078503.7.

* cited by examiner

TYRE FOR VEHICLE WHEELS

This application is a national phase application under 35 U.S.C. § 371 based on International Application No. PCT/IB2018/059207, filed Nov. 22, 2018, and claims priority of Italian Patent Application No. 102017000139816, filed Dec. 4, 2017; the contents of each application is incorporated herein by reference.

The present invention relates to a tyre for vehicle wheels, in particular a tyre for high-performance cars with reduced-noise.

A tyre generally comprises a carcass structure shaped toroidally about an axis of rotation and including at least one carcass ply having end edges engaged in respective annular anchoring structures, known as bead cores.

In a radially external position of the carcass structure, a belt structure is provided, comprising, in the case of car tyres, at least two radially superposed strips of rubberised fabric provided with reinforcement cords, usually metallic, arranged in each strip mutually parallel but crossing the cords of the adjacent strip, preferably symmetrically about the equatorial plane of the tyre.

Preferably, the belt structure further comprises, in a radially external position, at least on the ends of the underlying belt strips, a third layer of textile or metal cords, arranged circumferentially (at 0 degrees). In tubeless tyres, there is further a radially inner layer, known as a liner, which has impermeability features so as to ensure the airtightness of the tyre.

In a radially external position of the belt structure, a tread band made of elastomeric material is applied, on which a tread surface for contact with the road surface is defined.

To ensure sufficient road grip even on a wet road surface, the tyres have a tread band provided with grooves and notches of various shapes and geometries which delimit tread band portions intended to contact the ground, known as blocks.

The overall configuration of the tread band defined by the entirety of the grooves, notches and blocks forms the tread pattern.

The primary function of the grooves and notches is to make it possible to evacuate water present between the surface of the tyre and the road surface at the moment of mutual contact, preventing the hydrostatic pressure originating from the impact of the water against the advancing tyre from causing even partial lifting of the tyre from the road surface and preventing the resulting loss of control of the vehicle (a phenomenon known as "aquaplaning").

The grooves and notches formed on the tread band may further influence the traction features of the tyre as well as the directionality and stability features of the tyre in the various phases of driving the vehicle, for example during acceleration, braking or turning.

The tread pattern may not be symmetrical with respect to the equatorial plane of the tyre, and may provide a configuration which differs between the outer region of the tyre, which is intended to face outwards when the tyre is mounted on the vehicle, and the opposite, inner region of the tyre. In this way, each tread band portion can be configured in a manner better targeted to the different stresses and demands which may affect the outer and inner regions respectively of the tread band during travel on various road surfaces (dry, wet and snowy).

A tyre having a tread pattern of the type briefly described above is referred to as "asymmetrical".

The "equatorial plane" of the tyre refers to a plane perpendicular to the axis of rotation of the tyre and subdividing the tyre into two substantially equal parts.

The "axial direction" refers to a direction parallel to the axis of rotation of the tyre or, at most, inclined of 5° with respect to the direction of the axis of rotation of the tyre.

The "circumferential" direction refers to a direction generally directed along the direction of rotation of the tyre or, at most, inclined of 5° with respect to the direction of rotation of the tyre.

The term "groove" refers to a recess formed in a tread band portion having a width greater than or equal to 1.5 mm, preferably greater than or equal to 3 mm, and preferably a depth greater than 3 mm.

The term "notch" refers to a recess formed in a tread band portion having a width less than 1.5 mm, preferably less than or equal to 1 mm.

The width of said notches and grooves, or of a portion thereof, is understood to be measured at a depth greater than or equal to 1 mm from the road surface. If the notch or groove has a depth less than 1 mm from the tread surface, the width will be measured at the base of the notch or groove.

The term "recess" is understood as referring indiscriminately to a notch or to a groove.

A recess, in particular a notch, is defined as a "through"-recess if it is open to two or more distinct grooves, connecting them. A recess, in particular a notch, is defined as a "blind" recess if it is not a "through"-recess. In particular, a blind notch may have a first end open to a groove.

The "longitudinal extent" of a recess, in particular a notch, refers to the measurement of the length of the recess as measured along the direction of progression thereof on the tread surface, independently of the positioning or orientation thereof.

A recess, in particular a groove, is referred to as "circumferential" if the longitudinal direction thereof is substantially parallel to the circumferential direction or at most inclined at an angle less than 5° with respect to the circumferential direction.

A recess, in particular a groove, is referred to as "transverse" if it extends in a direction inclined at an acute angle greater than at least 10° to the circumferential direction.

The inclination of a direction with respect to a circumferential direction identified on the tread band is defined by the acute angle between said direction and the circumferential direction. As one specific instance, a direction extending parallel to the axis of the tyre will have an inclination of 90° to the circumferential direction.

Two transverse recesses have an inclination "having the same sign" if the progression thereof is increasing or decreasing for both of them when considered in a Cartesian plane positioned on the tread band (tangential thereto) with the y-axis parallel to the circumferential direction and the x-axis parallel to the axis of the tyre.

Therefore, two transverse recesses have an inclination "having opposite signs" if, as considered in the above-defined Cartesian plane, the progression thereof is increasing for one recess and decreasing for the other.

"Tread surface" refers to the radially outer surface portion of the tread band which is intended to come into contact with the road surface when the tyre is set in rotation.

"Tread pattern" refers to the overall configuration of the tread band as defined by the entirety of the grooves and notches.

It will be noted that the entirety of the grooves and notches represent the tread band portion which does not come into contact with the road surface when the tyre is set in rotation.

The band portion complementary thereto, formed by the tread band which comes into contact with the road surface when the tyre is set in rotation, may comprise "blocks", which are tread band portions delimited by grooves or notches or by the lateral edges of the tread band.

One specific instance of a block is a "rib", a tread band portion extending annularly along the entire circumferential extent of the tread band.

The "width" of a circumferential rib is defined as the average axial dimension along the circumferential progression of said rib.

The term "chamfer", in relation to a groove or notch, refers to a surface portion which joins a lateral wall of the groove or notch to the tread surface of the tyre and which has an inclination, with respect to the radial direction of the tyre, greater than the inclination of the lateral wall of the groove or notch.

Two recesses are "substantially aligned" if the longitudinal axes thereof, at least at the mutually facing respective ends thereof, are offset by an amount less than the width thereof (in the case of portions having different widths the larger width is considered) or by an amount of at most 5 mm.

Two recesses are "substantially parallel" if they extend at the same angle of inclination with respect to the circumferential direction or if the respective angles of inclination with respect to the circumferential direction differ at most by 20°, preferably at most by 10°.

Two recesses, in particular two notches, or two respective portions thereof, are "circumferentially corresponding" if the projections thereof along the circumferential direction on a plane are substantially coincident or differ from one another by a fraction less than 50% of the less extended projection.

A plurality of recesses, in particular notches, are arranged in "regular succession" along the circumferential development of the tread band or a portion thereof if each of said recesses, or each group of said recesses, is spaced apart circumferentially from an analogous recess or from an analogous group of recesses by a predetermined measurement, increased or diminished by 50%, preferably by 30%, of said predetermined measurement.

"Void-to-rubber ratio" refers to the ratio between the overall surface area of the grooves and notches included in a determined portion of the tread pattern of the tyre intended to rest on the ground (optionally of the entire tread pattern) and the overall surface area of the determined portion of tread pattern (optionally of the entire tread pattern).

"Effective void-to-rubber ratio" refers to the void-to-rubber ratio calculated when the tread band surface affected by any chamfers of depth less than 1 mm is considered to be in contact with the ground, in other words to be "full". This parameter, by comparison with the overall void-to-rubber ratio, makes clearer the fraction of the tread band surface affected by recesses (grooves or notches) which, by virtue of the depth thereof, will contribute more to the water evacuation capacity.

Further, it is noted that the void-to-rubber ratio of a tread band portion delimited by one or more circumferential grooves is calculated from half of the respective circumferential grooves.

WO 2009/060476, held by the same Applicant, describes a tyre of which the tread pattern comprises a pair of circumferential ribs on which respective pluralities of through-notches are formed.

WO 2006/007877, also held by the same Applicant, describes a tyre comprising a tread band on which a plurality of transverse grooves are formed comprising portions having different inclinations with respect to the circumferential direction. The Applicant has noted that the configuration of the tread pattern, as defined by the shape, orientation and number of grooves and notches, significantly contributes to determining other important parameters of the tyre, including in particular the noise level.

This parameter is taking on increasing importance in the development of new tyres, including when these are intended for use in high-performance automobiles, in which excellent braking properties, lateral hold properties during turning, and road behaviour properties, both on dry and on wet surfaces, are naturally also required.

In addition to these demands, there is the need to ensure sufficient capacity for rapid evacuation of water, which makes it possible to travel safely on a wet road surface without encountering aquaplaning phenomena.

The Applicant has further found that one significant source of noise is due to the presence of transverse grooves on the tread band.

The Applicant thus felt the need to provide a tyre comprising a tread pattern which, in addition to excellent performances in terms of lateral hold, traction and rolling resistance, is capable of provide extremely high performances in terms of noise level whilst still ensuring more than sufficient water evacuation capacity.

The Applicant has thus perceived that noise level parameters may be improved by modifying the tread pattern, in particular by means of reconfigurations of recesses, especially of transverse recesses.

The Applicant ultimately found that a tyre on one circumferential rib of which respective pluralities of appropriately shaped and configured notches are formed exhibits extremely high performances in terms of noise level.

In particular, in a first aspect thereof, the invention relates to a tyre for vehicle wheels comprising a tread band on which a circumferential direction is defined.

Preferably, a pair of shoulder regions which are axially opposite one another are formed on the tread band.

Preferably, at least one first circumferential rib which is arranged between said pair of shoulder regions, is formed on the tread band.

Preferably, said at least one first circumferential rib is delimited by a first and by a second circumferential groove.

Preferably, a plurality of first notches, which are arranged in regular succession along the entire circumferential extent of said first circumferential rib, is formed on said first circumferential rib.

Preferably, said first notches extend as a whole over at least 80% of the width of said first circumferential rib.

Preferably, each of said first notches comprises a first portion which has a first inclination with respect to said circumferential direction Preferably, said first portion is substantially rectilinear.

Preferably, each of said first notches comprises a second portion which has a second inclination with respect to said circumferential direction.

Preferably, said second portion is substantially rectilinear.

Preferably, said second inclination has a sign opposite to said first inclination.

Preferably, each of said first notches comprises a connecting portion that extends between said first portion and said second portion.

Preferably, a plurality of second notches, which are blind and are arranged in regular succession along the entire circumferential extent of said first circumferential rib, is formed on said first circumferential rib.

Preferably, said second notches are substantially parallel to said first portion of said first notches.

Preferably, a plurality of third notches, which are blind and are arranged in regular succession along the entire circumferential extent of said first circumferential rib, is formed on said first rib.

Preferably, said third notches are substantially parallel to said second portion of said first notches.

As a result of these features, the tyre according to the present invention has extremely high performances both in terms of noise level and in terms of traction, grip, handling and rolling resistance.

Indeed, the Applicant has verified that the configuration set out above of the notches on the tread band achieves a substantial reduction in the noise generated by the impact of this tread band portion on the road surface, thanks to the reduced width of the notches.

Further, the Applicant believes that the specific configuration set out above of the notches on the tread band allows to achieve a further reduction in the noise generated.

In particular, the provision of second notches and third notches substantially parallel, respectively, to the first portions and to the second portions of the first notches gives rise to acoustic vibrations of substantially the same frequency, thus avoiding the generation of sounds of intermediate frequencies which, as a whole, form noises which cause a greater disturbance to the human ear.

Further, the circumferential rib is delimited by a pair of circumferential grooves capable of effectively evacuating the water which may be present on the road surface.

Further, the configuration set out above of notches increases the distinctiveness of the tyre, in such a way that it can be easily visually identifiable for the users simply from the tread pattern, and can thus immediately be associated with a specific commercial brand.

In the aforementioned aspect, the present invention may have at least one of the further preferred features set out below.

Preferably, said first notches are through-notches.

Preferably, said first portion, said second portion and said connecting portion as a whole extend over a fraction of at least 80% of the width of said first circumferential groove.

Preferably, said first portion extends from said first circumferential groove.

Preferably, said second portion extends from said second circumferential groove.

Preferably, said connecting portion is curvilinear.

Preferably, said first portion extends from said first circumferential groove up to between 50% and 70% of the width of said first circumferential rib.

Preferably, said second portion extends from said second circumferential groove up to between 10% and 25% of the width of said first circumferential rib.

Preferably, said first inclination is smaller in modulus than said second inclination.

Preferably, said first inclination is between 15° and 45°.

Preferably, said second inclination is between 50° and 80°.

As a result of these features, the first notches, and therefore also the second and third notches substantially parallel thereto, enter a footprint area gradually and continuously, limiting the noise generated by the contact with the road surface.

Further, likewise as a result of this geometric configuration, the first and second portions of the first notches are asymmetrical with one another about the circumferential direction, in other words not axially aligned.

Preferably, said first notches comprise a first end region extending from said first circumferential groove, a second end region extending from said second circumferential groove, and a central region arranged between said first and second end regions.

Preferably, said central region is of a depth less than 60% of the depth of said end regions.

Preferably, said central region has a depth less than 3 mm.

Preferably, said first end region circumferentially corresponds to said second notch.

Preferably, said second end region circumferentially corresponds to said third notch.

Preferably, said first and second end region have a depth greater than 5 mm, more preferably between 5 and 7 mm.

As a result of these features, the generation of sounds of different frequencies is further limited. In particular, the central region of the first notches is effectively "silenced" by reducing substantially the depth thereof.

Preferably, said central region has an extension of between 50% and 70% of the entire longitudinal extension of said first notches.

Preferably, said second blind notches extend from said first circumferential groove up to between 20% and 40% of the width of said first circumferential rib.

Preferably, said third blind notches extend from said second circumferential groove up to between 15% and 30% of the width of said first circumferential rib.

Preferably, a number of said second notches equal to the number of said third notches are provided between each pair of successive first notches.

Preferably, one of said second notches and one of said third notches are provided between each pair of first notches.

Preferably, said second notch and said third notch are arranged in a position substantially equidistant from the first notches of said pair.

In a preferred embodiment, at least one additional circumferential rib is provided in said tread band between said pair of shoulder regions, in which additional circumferential rib a plurality of fourth notches is provided, which are arranged in regular succession along the entire circumferential extent of said additional circumferential rib.

Preferably, said fourth notches are substantially rectilinear.

Preferably, said fourth notches are through-notches.

Preferably, said fourth notches are substantially aligned with said second portions of said first notches.

In this way, the distinctiveness of the tyre is further increased, in such a way that it can easily be recognised by users, thus making it more associable with a specific commercial brand.

Preferably, said fourth notches comprise a first end region and a second end region, extending from opposite circumferential grooves, as well as a central region interposed between said first and second end regions, and in which said central region has a depth less than 60% of the depth of said end regions.

Preferably, said central region has a depth less than 3 mm.

Preferably, said first and second end region have a depth greater than 5 mm.

In a preferred embodiment, a plurality of fifth notches is provided in said at least one additional circumferential rib, which are arranged in regular succession along the entire circumferential extent of said additional circumferential rib.

Preferably, said fifth notches are substantially rectilinear.

Preferably, said fifth notches are substantially aligned with said third notches.

In this way, the distinctiveness of the tyre is further increased, in such a way that it can easily be recognised by users, thus making it more associable with a specific commercial brand.

In a first embodiment, said fifth notches are through-notches.

Preferably, said fifth notches comprise a first end region and a second end region, extending from circumferentially opposite grooves, as well as a central region interposed between said first and second end regions, and in which said central region has a depth less than 60% of the depth of said end regions.

Preferably, said central region has a depth less than 3 mm.

Preferably, said first and second end regions have a depth greater than 5 mm.

In an alternative embodiment, said fifth notches are blind.

Preferably, said fifth notches extend up to between 40% and 60% of the width of said at least one further circumferential rib.

Preferably, said fifth notches extend from a circumferential groove delimiting said at least one additional circumferential rib.

Preferably, said fifth notches comprise a first end region extending from a circumferential groove and a second inner region extending in said circumferential rib, in which the depth of said second internal region is less than 60% of the depth of said first end region.

More preferably, the depth of said second inner region is less than 3 mm and the depth of said first end region is greater than 5 mm.

Preferably, said first end region of said fourth notches circumferentially corresponds to the first end region of said fifth notches.

Preferably, said second end region of said fourth notches circumferentially corresponds to the second end region of said fifth notches.

Preferably, said at least one additional circumferential rib is adjacent to said first circumferential rib.

Preferably, said first circumferential groove has a smaller width than said second circumferential groove.

Preferably, said first circumferential groove has a smaller width than the circumferential grooves delimiting said at least one additional circumferential rib.

In this way, high rigidity of the tread band portion affected by the first circumferential groove with respect to the other tread band portions is maintained.

Preferably, said at least one additional circumferential rib comprises a second circumferential rib adjacent to said first circumferential rib and a third circumferential rib adjacent to said second circumferential rib on the side opposite to said first circumferential rib.

Preferably, on said second circumferential rib said fifth notches are blind.

Preferably, on said third circumferential rib said fifth notches are through-notches.

Preferably, said tread band is divided by an equatorial plane of said tyre into an outer tread band region, which faces the outside of said vehicle when the tyre is mounted on said vehicle, and an inner tread band region, which is axially opposite said outer region.

Preferably, the void-to-rubber ratio of the overall tread band is between 0.33 and 0.39, preferably between 0.35 and 0.37.

Preferably, the void-to-rubber ratio of the outer tread band region is between 0.33 and 0.39, preferably between 0.35 and 0.37.

Preferably, the void-to-rubber ratio of the inner tread band region is between 0.33 and 0.39, preferably between 0.35 and 0.37.

Preferably, the effective void-to-rubber ratio of the overall tread band is between 0.24 and 0.31, preferably between 0.26 and 0.29.

Preferably, the effective void-to-rubber ratio of the outer tread band region is between 0.23 and 0.29, preferably between 0.25 and 0.27.

Preferably, the effective void-to-rubber ratio of the inner tread band region is between 0.25 and 0.32, preferably between 0.27 and 0.30.

Preferably, said at least one first circumferential rib is provided in said outer tread band region.

Preferably, said third circumferential rib is provided in said inner tread band region.

Preferably, said second circumferential rib is provided in a region of said tread band which spans across said equatorial plane.

In a preferred embodiment, said tread band comprises a shoulder region adjacent to said first circumferential rib.

Preferably, a plurality of first transverse grooves is provided in said shoulder region.

Preferably, said first transverse grooves comprise a first curvilinear portion having a first concavity.

Preferably, said first transverse grooves are connected to said first circumferential groove, which separates said shoulder region from said first circumferential rib, by means of first connecting notches.

Preferably, said first connecting notches are substantially aligned with said first portions of said first notches or with said second notches.

Preferably, said first transverse grooves extend at an inclination of between 70° and 90° with respect to said circumferential direction.

More preferably, said first transverse grooves extend at an inclination of between 70° and 85° with respect to said circumferential direction.

Preferably, said first transverse grooves have an inclination with respect to said circumferential direction having the same sign as said first inclination.

In a preferred embodiment, said tread band comprises a shoulder region adjacent to said at least one additional circumferential rib.

Preferably, a plurality of second transverse grooves is provided in said shoulder region.

Preferably, said second transverse grooves comprise a second curvilinear portion having a second concavity.

Preferably, said second transverse grooves are connected to a circumferential groove, delimiting said additional circumferential groove, by means of second connecting notches.

Preferably, said second connecting notches are substantially aligned with said fourth notches or with said fifth notches.

Preferably, said second transverse grooves extend at an inclination of between 70° and 90° with respect to said circumferential direction.

More preferably, said second transverse grooves extend at an inclination of between 70° and 85° with respect to said circumferential direction.

Preferably, said second transverse grooves have an inclination with respect to said circumferential direction having the same sign as said first inclination.

Preferably, said first and second transverse grooves are substantially parallel.

Preferably, said first curvilinear portions of said first transverse grooves and said second curvilinear portions of said second transverse grooves have a concavity with respect to an axial direction defined on the tread band which is opposite to each other.

Preferably, said first and second transverse grooves are axially offset by a measurement equal to approximately a quarter of the axial distance between successive first transverse grooves.

In other words, the first and second transverse grooves are mutually axially offset by a quarter of a pitch.

In this way, the acoustic vibrations generated by the impact of the first and second transverse grooves with the road surface, having substantially the same frequency, are suitably mutually offset, in such a way that some of the generated sound waves cancel out through interference.

Preferably, said first notches and/or said second notches and/or said third notches and/or said fourth notches and/or said fifth notches and/or said first transverse grooves and/or said second transverse grooves are connected to a tread surface, defined in a radially external position on said tread band, by a respective chamfer.

In this way, the impact of the notch or groove with the road surface is made less abrupt, further limiting the generated noise.

Further, the provision of the chamfers highlights the configuration of the notches, so as further to increase the distinctiveness of the tyre and to facilitate immediate identification thereof by users.

Preferably, the first circumferential rib is free of transverse grooves.

More preferably, both the first circumferential rib and the at least one circumferential rib are free of transverse grooves.

Most preferably, the entire tread band portion between said opposite shoulder regions is free of transverse grooves.

The features and advantages of the invention will be more apparent from the detailed description of a preferred embodiment thereof, given in an illustrative and non-limiting manner with reference to the accompanying drawings, in which.

Referring to the enclosed drawings, 1 denotes as a whole a tyre for vehicle wheels made in accordance with the present invention.

The tyre 1 comprises a tyre structure which is conventional per se, not shown in the appended drawings, as well as a tread band 2 on which a tread surface 3 is defined, which is arranged in a radially external position on the tread band 2 and which is intended to come into contact with a road surface.

The tyre 1 has a conventional, generically toroidal shape extending about an axis of rotation, defining on the tread surface 3 an axial direction Y parallel thereto, and traversed by an equatorial plane X, perpendicular to the axis of rotation and defining on the tread surface 3 a circumferential direction parallel thereto.

The tyre 1 is preferably arranged for mounting on a high-performance car and has a width of nominal section of approximately 245 mm and a rim diameter of 18 inches.

An effective width L of approximately 200 mm, defined as the maximum width of the tread band intended to come into contact with the ground under standard conditions of use, is identified on the tread band 2.

The equatorial plane X divides the tread band 2 into an outer tread band region 5, intended to face towards the outside of the vehicle when the tyre is mounted on the vehicle, and an inner tread band region 6, axially opposite the outer region 5.

A first circumferential groove 10, a second circumferential groove 11, a third circumferential groove 12 and a fourth circumferential grove 13 are formed on the tread band 2.

On the side axially opposite the equatorial plane X, the first circumferential groove 10 delimits an outer shoulder region 7, whilst the fourth circumferential groove 13, respectively, delimits an inner shoulder region 8.

The outer shoulder region 7 and the inner shoulder region 8 are further delimited, in each case at the axially external side thereof, by the outer edge 9a and by the inner edge 9b of the tread band 2.

In the tread band region interposed between the outer and inner shoulder regions 7 and 8, the following are further defined:

a first circumferential rib 14, delimited by the first and second circumferential groove 10 and 11 within the outer tread band region 5;

a second circumferential rib 15, delimited by the second and third circumferential grooves 11 and 12 astride the equatorial plane X; and a third circumferential rib 16, delimited by the third and fourth circumferential groove 12 and 13 within the inner tread band region 6.

The first circumferential groove 10 has a constant width of between 5 and 10 mm, for example of approximately 8 mm, less than the other circumferential grooves.

The second and third circumferential grooves 11 and 12 have a constant width of between 10 and 15 mm, for example of approximately 13 mm, substantially identical to one another, whilst the fourth circumferential groove 13 has a constant width of between 8 and 15 mm, for example of approximately 11 mm.

The circumferential grooves 10, 11, 12 and 13 have a substantially identical depth of approximately 7 mm.

The first, second and third circumferential ribs 14, 15 and 16 have a width of between 20 and 30 mm, for example of approximately 23-24 mm.

A plurality of first through-notches 20, a plurality of second blind notches 30, and a plurality of third blind notches 40, all arranged in modular succession along the circumferential extent of the first circumferential rib 14, are formed on the first circumferential rib 14.

Each first notch 20 extends between a first end 26 thereof, open to the first circumferential groove 10, and a second end 27, open to the second circumferential groove 11.

Each first notch 20 comprises a first portion 21, substantially rectilinear, extending from the first circumferential groove 10 towards the second circumferential groove 11, a second portion 22, also substantially rectilinear, extending from the second circumferential groove 11 towards the first circumferential groove 10, and a curved connecting portion 23 extending between the first portion 21 and the second portion 22.

The first portion 21 extends at a first inclination with respect to the circumferential direction, having a value of approximately 31°, in modulus, whilst the second portion 22 extends at a second inclination with respect to the circumferential direction, having a sign opposite to the first inclination, having a value of approximately 65°, in modulus.

The first portion 21 has a longitudinal extent of approximately 25 mm and extends from the first circumferential groove 10 up to approximately 60% of the width of the first circumferential rib 14, whilst the second portion 22 has a longitudinal extent of approximately 5 mm and extends from the second circumferential groove 11 up to approximately 15% of the width of the first circumferential rib 14.

Each first notch 20 further comprises a first end region 24a, extending approximately 10 mm from the first circumferential groove 10, a second end region 24b, extending approximately 5 mm from the second circumferential groove 11, and a central region 25 interposed between the first and second end regions 24a and 24b.

Each first notch 20 has a substantially constant width of approximately 0.6 mm along the longitudinal extent thereof and a variable depth. In particular, the depth of the first notch 20 at the first and at the second end region 24a, 24b is approximately 5.5 mm whilst at the central region 25 it is approximately 2 mm.

Each first notch 20 is further connected to the tread surface 3 by respective chamfers 28, approximately 1.5 mm wide, which join the tread surface 3 to the respective lateral walls of the first notch 20 at a depth of approximately 0.5 mm.

Each second notch 30, blind, extends, in a position equidistant between a pair of successive first notches 20, between a first end 31 thereof, open to the first circumferential groove 10, and a second end 32 thereof, within the first circumferential rib 14.

Each second notch 30 is parallel to the first portion 21 of the first notches 20, and, in particular, circumferentially corresponds to the first end region 24a thereof.

Each second notch 30 has a substantially constant width of approximately 0.6 mm along the longitudinal extent thereof and a substantially constant depth of approximately 5.5 mm, apart from an inner region close to the second end 32 where the depth is reduced to approximately 2 mm.

Each second notch 30 has a longitudinal extent of approximately 10-15 mm, and extends from the first circumferential groove 10 up to approximately 30% of the width of the first circumferential rib 14.

Each second notch 30 is further connected to the tread surface 3 by respective chamfers 33, approximately 1.5 mm wide, tapered at the second end 32, which join the tread surface 3 to the respective lateral walls of the second notch 30 at a depth of approximately 0.5 mm.

Each third notch 40, blind, extends, in a position equidistant between a pair of successive first notches 20, between a first end 41 thereof, open to the second circumferential groove 11, and a second end 42 thereof, within the first circumferential rib 14.

Each third notch 40 is parallel to the second portion 22 of the first notches 20 and, in particular, circumferentially corresponds to the second end region 24b thereof.

Each third notch 40 has a substantially constant width of 0.6 mm along the longitudinal extent thereof and a substantially constant depth of approximately 5.5 mm.

Each third notch 40 has a longitudinal extent of approximately 5 mm and extends from the second circumferential groove 11 up to approximately 22% of the width of the first circumferential rib 14.

Each third notch 40 is further connected to the tread surface 3 by respective chamfers 43, approximately 1.5 mm wide, tapered at the second end 42, which join the tread surface 3 to the respective lateral walls of the third notch 40 at a depth of approximately 0.5 mm.

A plurality of fourth through-notches 50, arranged in succession along the circumferential extent of the second and third circumferential ribs 15 and 16, are formed on the second and third circumferential ribs 15 and 16.

The fourth notches 50 are presently described in detail referring to the second circumferential rib, but this description may easily be applied analogously to the fourth notches 50 provided on the third circumferential rib 16, making sure to replace the second and third circumferential grooves 11 and 12 with the third and fourth circumferential grooves 12 and 13, respectively.

Each fourth groove 50 extends on the second circumferential rib 15 substantially rectilinearly between a first end 51 open to the second circumferential groove 11 and a second end 52 open to the third circumferential groove 12.

Each fourth notch 50 is substantially aligned with a second portion 22 of a first notch 20, in such a way that all of the fourth notches 50 are mutually parallel.

Analogously to the first notches 20, each fourth notch 50 further comprises a first end region 53, extending approximately 5-6 mm from the second circumferential groove 11, a second end region 54, extending approximately 5-6 mm from the third circumferential groove, and a central region 55, interposed between the first and second end regions 53 and 54.

Each fourth notch 50 has a substantially constant width of approximately 0.6 mm along the longitudinal extent thereof and a variable depth. In particular, the depth of the fourth notch 50 at the first and at the second end region 53, 54 is approximately 5.5 mm whilst at the central region 55 it is approximately 2 mm. Each fourth notch 50 is further connected to the tread surface 3 by respective chamfers 56, approximately 1.5 mm wide, partially divergent at the first and second ends 51 and 52, which join the tread surface 3 to the respective lateral walls of the fourth notch 50 at a depth of approximately 0.5 mm.

A plurality of fifth notches, denoted as 60 and 70 respectively, arranged in succession along the circumferential extent of the second and third circumferential ribs 15 and 16, are further formed on the second and third circumferential ribs 15 and 16.

Each fifth notch 60, 70 is substantially rectilinear and aligned with a third notch 40.

In this way, the fifth notches 60 formed on the second circumferential rib 15 and the fifth notches formed on the third circumferential rib 16 are also aligned with one another.

Each fifth notch 60 provided on the second circumferential rib 15 is blind and extends between a first end 61, open to the second circumferential groove 11, and a second end 62, within the second circumferential groove 15.

Each fifth notch 60 has a longitudinal extent of approximately 15 mm and extends from the second circumferential groove 11 up to approximately 50% of the width of the second circumferential rib 15.

Analogously to the fourth notches 50, each fifth notch 60 further comprises a first end region 63, extending approximately 5-6 mm from the second circumferential groove 11, and a second inner region 64, extending from the first end region towards the second end 62.

Each fifth notch 60 has a substantially constant width of approximately 0.6 mm along the longitudinal extent thereof and a variable depth. In particular, the depth of each fifth notch 60 at the first end region 63 is approximately 5.5 mm whilst at the second inner region it is approximately 2 mm.

The first end region 63 of the fifth notches 60 circumferentially corresponds to the first end region 53 of the fourth notches 50.

Each fifth notch 60 is further connected to the tread surface 3 by respective chamfers 65, 1.5 mm wide, tapered at the second end 62, which join the tread surface 4 to the respective lateral walls of the third notch 60 at a depth of approximately 0.5 mm.

The fifth notches 70 formed on the third circumferential groove 16, however, are through-notches, and extend substantially rectilinearly between a first end 71, open to the third circumferential groove 12, and a second end 72, open to the fourth circumferential groove 13.

The fifth notches 70 are substantially identical to the fourth notches 50, in such a way that the third circumferential rib 16 is affected by notches which are all the same as one another.

In particular, each fifth notch 70 further comprises a first end region 73, extending approximately 5-6 mm from the third circumferential groove 12, a second end region 74, extending approximately 5-6 mm from the fourth circumferential groove 13, and a central region 75 interposed between the first and second end regions 73 and 74.

Further, each fifth notch 70 has a substantially constant width of approximately 0.6 mm along the longitudinal extent thereof and a variable depth. In particular, the depth of the fifth notch 70 at the first and second end regions 73, 74 is approximately 5.5 mm, whilst at the central region 75 it is approximately 2 mm.

Each fifth notch 70 is further connected to the tread surface 3 by respective chamfers 76, approximately 1.5 mm wide, partially diverging at the first and second ends 71 and 72, which join the tread surface 3 to the respective lateral walls of the fifth notch 70 at a depth of approximately 0.5 mm.

In the preferred embodiment presently described, the second circumferential rib 15 spans across the equatorial plane X, whilst the third circumferential rib 16 is positioned in the inner tread band region 6, on the side opposite the first circumferential rib 14.

However, in an alternative embodiment, it is provided that the position of the second and third circumferential ribs is reversed, with the third circumferential rib 16 astride the equatorial plane X and the second circumferential rib 15 positioned in the inner tread band region 6.

A plurality of first transverse grooves 80, extending towards the first circumferential groove 10 at an inclination with respect to the circumferential direction having the same sign as the inclination of the first portion 21 of the first grooves 20 and of approximately 80° in modulus, are formed in the outer shoulder region 7.

Each first transverse groove 80 has a width of between 3 and 5 mm and a depth of approximately 6-7 mm, which decreases continuously when approaching the outer edge 9a of the tread band 2.

The first transverse grooves 80 are joined to the first circumferential groove 10 by first connecting notches 81, each of which is aligned with a first portion 21 of a first notch 20 or with a second notch 30.

Each first connecting notch 81 has a constant width of approximately 0.6 mm and a depth of approximately 2 mm.

The first transverse grooves 80 are slightly curved, with a concavity facing in the circumferential direction towards which the associated connecting notch 81 extends.

Each first connecting notch 81 and a portion of each first transverse groove 80 (substantially corresponding to the transverse groove portion within the effective width of the tread band 2) are further connected to the tread surface 3 by respective chamfers 82, approximately 1.5 mm wide and tapered at the first transverse groove 80, which join the tread surface 3 to the respective lateral walls of the first connecting notch 81 and of the first transverse groove 80 at a depth of approximately 0.5 mm.

A plurality of second transverse grooves 90, extending towards the fourth circumferential groove 13 at an inclination with respect to the circumferential direction having the same sign as the inclination of the first portion 21 of the first notches 20 and of approximately 80° in modulus, are formed in the inner shoulder region 8.

Each second transverse groove 90 has a width of between 3 and 5 mm and a depth of approximately 6-7 mm, which decreases continuously when approaching the inner edge 9b of the tread band 2.

The second transverse grooves 90 are joined to the fourth circumferential groove 13 by second connecting grooves 91, each of which is aligned with a fourth notch 50, or with a fifth notch 70 formed on the third circumferential rib 16.

Each second connecting notch 91 has a constant width of approximately 0.6 mm and a depth of approximately 2 mm.

Each second connecting notch 91 and a portion of each second transverse groove 90 (substantially corresponding to the transverse groove portion within the effective width of the tread band 2) are further connected to the tread surface 3 by respective chamfers 92, approximately 1.5 mm wide and tapered at the second transverse groove 90, which join the tread surface 3 to the respective lateral walls of the second connecting notch 91 and of the second transverse 90 at a depth of approximately 0.5 mm.

The second transverse grooves 90 are also slightly curved, but the concavity thereof faces in the circumferential direction opposite the associated connecting notch 91. The second transverse grooves 90 and the first transverse grooves 80 thus have opposite concavity with respect to the axial direction Y.

The second transverse grooves 90 and the first transverse grooves 80 are further misaligned with respect to the axial direction Y by a measurement of approximately a quarter of the distance between a pair of successive first transverse grooves 80 (said distance being defined as a "pitch").

In the above-described preferred embodiment, the notches and transverse grooves are all connected to the tread surface 3 by respective chamfers. However, in an alternative variant embodiment, the notches and transverse grooves are connected directly to the tread surface 3, without chamfers being provided.

The tread pattern of the tyre 1, as defined by the above-described configuration of grooves and notches, brings about specific void-to-rubber ratios in the different tread band portions.

Table 1 below sets out, for some significant portions of the tread band 2, the overall void-to-rubber ratio values (thus considering the part of the surface affected by chamfers having a depth less than 1 mm to be surface which is not in contact with the road surface), as well as the effective full-empty ratio values (thus considering the part of the surface affected by chamfers having a depth less than 1 mm to be surface which is in contact with the road surface), calculated over the total width of the tread band 2.

In particular, in Table 1 the various tread band portions are denoted as follows:

Portion A: tread band portion between the inner edge 9b and outer edge 9a of the tread band;

Portion B: tread band portion between the equatorial plane X and the outer edge 9a of the tread band;

Portion C: tread band portion between the equatorial plane X and the inner edge 9b of the tread band;

Portion D: tread band portion between the first circumferential groove 10 and the outer edge 9a of the tread band;

Portion E: tread band portion between the first circumferential groove 10 and the second circumferential groove 11;

Portion F: tread band portion between the second circumferential groove 11 and the third circumferential groove 12;

Portion G: tread band portion between the third circumferential groove 12 and the fourth circumferential groove 13;

Portion H: tread band portion between the fourth circumferential groove and the inner edge 9b of the tread band.

Figure 1:
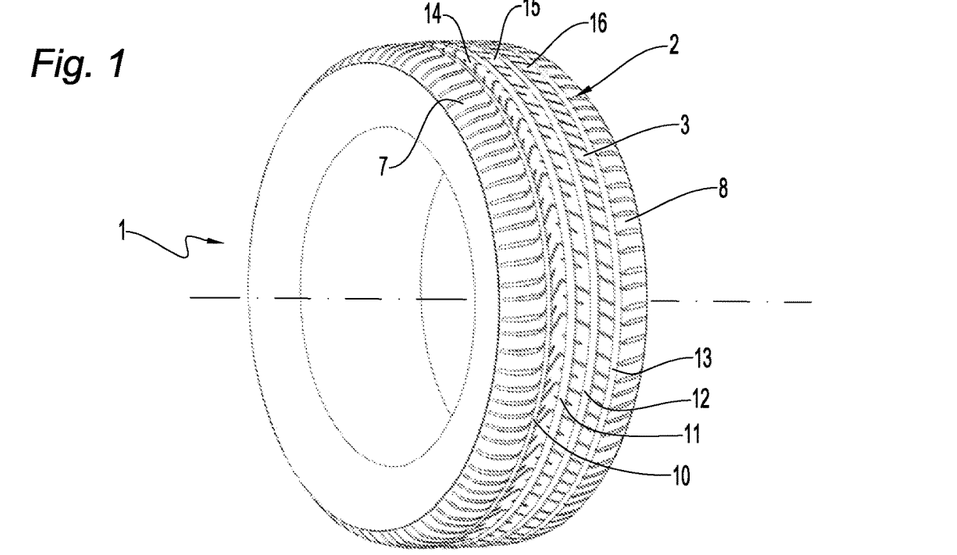
FIG. 1 is a perspective view of a tyre for vehicle wheels realised in accordance with the present invention.
Figure 2:
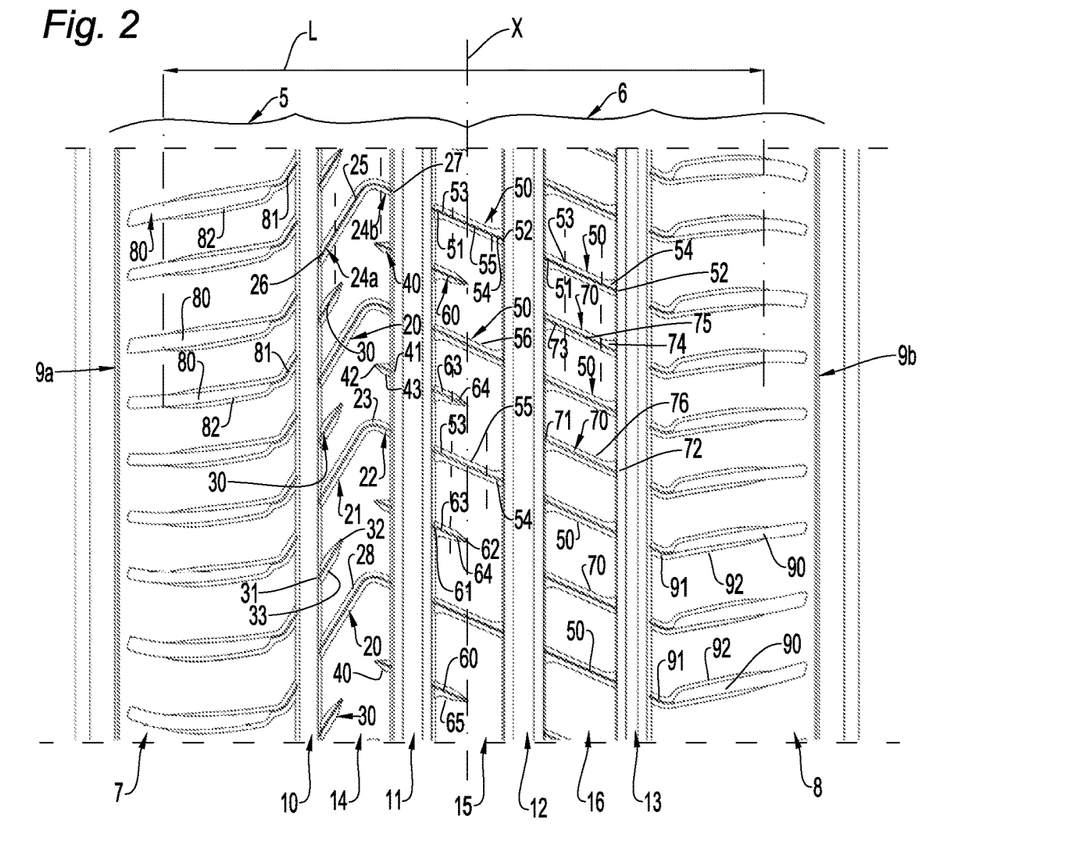
FIG. 2 is a schematic view on an enlarged scale of a significant portion of the tread band of the tyre of FIG. 1.
Figure 3:
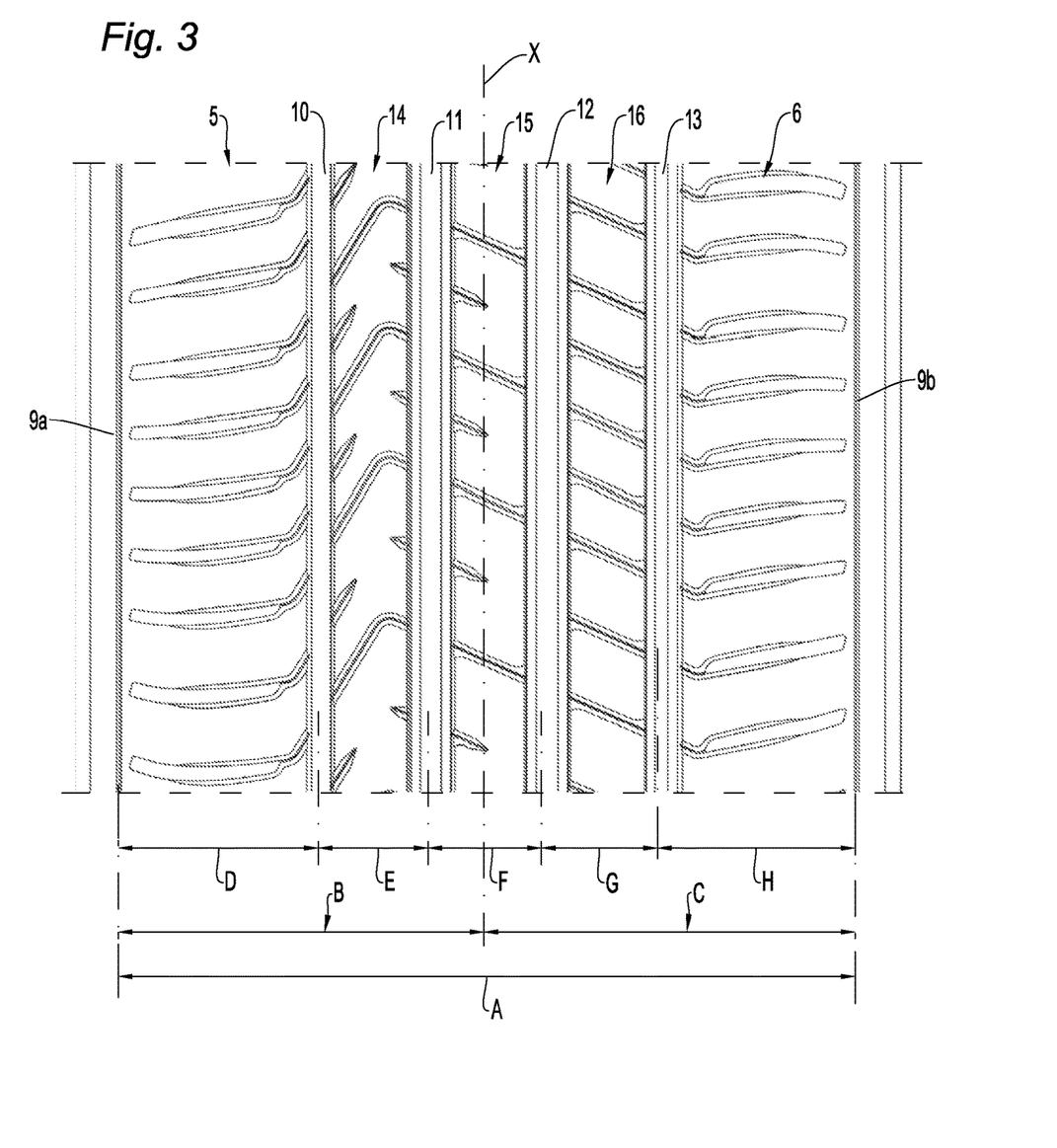
FIG. 3 is a view analogous to FIG. 2 in which some significant tread band portions are particularly highlighted.

FIG. 3 shows the tread band portions A-H.

TABLE 1

| Tread band portion | Overall void-to-rubber ratio over total width | Effective void-to-rubber ratio over total width |
| --- | --- | --- |
| Portion A | 0.361 | 0.274 |
| Portion B | 0.358 | 0.262 |
| Portion C | 0.364 | 0.286 |
| Portion D | 0.286 | 0.196 |
| Portion E | 0.451 | 0.328 |
| Portion F | 0.475 | 0.382 |
| Portion G | 0.471 | 0.363 |
| Portion H | 0.286 | 0.221 |

As a result of the features described in detail above, the tyre 1 has greatly reduced noise levels, whilst simultaneously offering extremely good features as regards traction, road grip and driveability on both dry and wet road surfaces.

Further, the water evacuation capacity, in particular in the prevention of aquaplaning phenomena, remains highly suitable.

Naturally, for the purpose of satisfying specific contingent application requirements, a person skilled in the art may add further modifications and variants to the above-described invention whilst still remaining within the scope of protection as defined in the following claims.

The invention claimed is:

1. A tyre for vehicle wheels, comprising a tread band on which a circumferential direction is defined and wherein the tread band comprises:
    a pair of shoulder regions that are axially opposite one another;
    at least one first circumferential rib arranged between the pair of shoulder regions and is delimited by a first circumferential groove and by a second circumferential groove;
    a plurality of first notches, which are arranged in regular succession along the entire circumferential extent of the first circumferential rib and extend as a whole over at least 80% of a width of the first circumferential rib, wherein each of the first notches comprises:
        i. a first portion which is substantially rectilinear and has a first inclination with respect to the circumferential direction,
        ii. a second portion which is substantially rectilinear and has a second inclination with respect to the circumferential direction, having a sign opposite to the first inclination, and
        iii. a connecting portion that extends between the first portion and the second portion,
    a plurality of second notches, which are blind and are arranged in regular succession along the entire circumferential extent of the first circumferential rib and are substantially parallel to the first portion of the first notches; and
    a plurality of third notches, which are blind and arranged in regular succession along the entire circumferential extent of the first circumferential rib and are substantially parallel to the second portion of the first notches.

2. The tyre according to claim 1, wherein the first notches are through-notches.

3. The tyre according to claim 1, wherein the first portion extends from the first circumferential groove up to between 50% and 70% of the width of the first circumferential rib.

4. The tyre according to claim 1, wherein the second portion extends from the second circumferential groove up to between 10% and 25% of the width of the first circumferential rib.

5. The tyre according to claim 2, wherein the first notches further comprise a first end region extending from the first circumferential groove, a second end region extending from the second circumferential groove and a central region arranged between the first and second end regions, and wherein a depth of the central region is smaller than 60% of a depth of the end regions.

6. The tyre according to claim 5, wherein the central region has an extension of between 50% and 70% of an overall longitudinal extension of the first notches.

7. The tyre according to claim 1, wherein the second notches extend from the first circumferential groove up to between 20% and 40% of the width of the first circumferential rib.

8. The tyre according to claim 1, wherein the third notches extend from the second circumferential groove up to between 15% and 30% of the width of the first circumferential rib.

9. The tyre according to claim 1, wherein one of the second notches and one of the third notches are provided between each pair of first notches that are subsequent to each other, or one of the second notches or one of the third notches is provided between each pair of first notches that are subsequent to each other.

10. The tyre according to claim 9, wherein the second notch and the third notch are arranged substantially equidistantly from the first notches of the pair, or the second notch or the third notch is arranged substantially equidistantly from the first notches of the pair.

11. The tyre according to claim 1, wherein at least one additional circumferential rib is provided in the tread band between the pair of shoulder regions, the additional circumferential rib comprising a plurality of fourth notches arranged in regular succession along the entire circumferential extent of the additional circumferential rib.

12. The tyre according to claim 11, wherein the fourth notches are substantially aligned with the second portions of the first notches.

13. The tyre according to claim 11, wherein a plurality of fifth notches is provided in the at least one additional circumferential rib and are arranged in regular succession along the entire circumferential extent of the additional circumferential rib.

14. The tyre according to claim 13, wherein the fifth notches are substantially aligned with the third notches.

15. The tyre according to claim 11, wherein the at least one additional circumferential rib is adjacent to the first circumferential rib.

16. The tyre according to claim 1, wherein a width of the first circumferential groove is smaller than a width of the second circumferential groove.

17. The tyre according to claim 13, wherein the at least one additional circumferential rib comprises a second circumferential rib that is adjacent to the first circumferential rib and a third circumferential rib that is adjacent to the second circumferential rib and on the axially opposite side of the second circumferential rib as compared to the first circumferential rib.

18. The tyre according to claim 17, wherein the fifth notches are provided in both the second circumferential rib and the third circumferential rib, and the fifth notches in the second circumferential rib are blind notches and the fifth notches in the third circumferential rib are through-notches.

19. The tyre according to claim 17, wherein the tread band is divided by an equatorial plane (X) of the tyre into an outer tread band region, which faces an outside of a vehicle when the tyre is mounted on the vehicle, and an inner tread band region, which is axially opposite the outer tread band region, and wherein the at least one first circumferential rib is provided in the outer tread band region, the third circumferential rib is provided in the inner tread band region and the second circumferential rib is provided in a tread band region which spans across the equatorial plane.

20. The tyre according to any claim 1, wherein the tread band comprises a shoulder region that is adjacent to the first circumferential rib, and wherein a plurality of first transverse grooves are provided in the shoulder region and are connected to the first circumferential groove, which separates the shoulder region from the first circumferential rib, by the first connecting notches that are substantially aligned with the first portions of the first notches or with the second notches.

21. The tyre according to claim 13, wherein the tread band comprises a shoulder region that is adjacent to the at least one additional circumferential rib, and wherein a plurality of second transverse grooves are provided in the shoulder region and are connected to a circumferential groove, which delimits the additional circumferential rib, by the second connecting notches that are substantially aligned with the fourth notches or with the fifth notches.

22. A tyre for vehicle wheels, comprising a tread band on which a circumferential direction is defined and in which there are provided:
   a pair of shoulder regions that are axially opposite one another;
   at least one first circumferential rib that is arranged between the pair of shoulder regions and is delimited by a first circumferential groove and by a second circumferential groove;
   a plurality of first notches, which are arranged in regular succession along the entire circumferential extent of the first circumferential rib and extend as a whole over at least 80% of a width of the first circumferential rib, wherein each of the first notches comprises:
   i. a first portion which is substantially rectilinear and has a first inclination with respect to the circumferential direction,
   ii. a second portion which is substantially rectilinear and has a second inclination with respect to the circumferential direction, having a sign opposite to the first inclination, and
   iii. a connecting portion that extends between the first portion and the second portion,
   a plurality of second notches, which are blind and are arranged in regular succession along the entire circumferential extent of the first circumferential rib and are substantially parallel to the first portion of the first notches, and
   a plurality of third notches, which are blind and arranged in regular succession along the entire circumferential extent of the first circumferential rib and are substantially parallel to the second portion of the first notches;
      wherein at least one additional circumferential rib is provided in the tread band between the pair of shoulder regions, the additional circumferential rib comprising a plurality of fourth notches arranged in regular succession along the entire circumferential extent of the additional circumferential rib,
      wherein a plurality of fifth notches is provided in the at least one additional circumferential rib and are arranged in regular succession along the entire circumferential extent of the additional circumferential rib,
      wherein the tread band comprises a shoulder region that is adjacent to the first circumferential rib, and wherein a plurality of first transverse grooves are provided in the shoulder region and are connected to the first circumferential groove, which separates the shoulder region from the first circumferential rib, by the first connecting notches that are substantially aligned with the first portions of the first notches or with the second notches,
      wherein the tread band comprises a shoulder region that is adjacent to the at least one additional circumferential rib, and wherein a plurality of second transverse grooves are provided in the shoulder region and are connected to a circumferential groove, which delimits the additional circumferential rib, by the second connecting notches that are substantially aligned with the fourth notches or with the fifth notches, and
      wherein the first and second transverse grooves are axially offset by approximately a quarter of the axial distance between first transverse grooves that are subsequent to one another.

23. The tyre according to claim 22, wherein the first transverse grooves comprise a first curvilinear portion having a first concavity with respect to an axial direction defined on the tread band, and the second transverse grooves comprise a second curvilinear portion having a second concavity with respect to the axial direction, the second concavity being opposite the first concavity.

24. The tyre according to claim 13, wherein the first notches, the second notches, the third notches, the fourth notches, and the fifth notches are connected to a tread surface defined on a radial outer position of the tread band by a chamfer.

* * * * *